(12) United States Patent
Sander et al.

(10) Patent No.: US 8,574,391 B2
(45) Date of Patent: Nov. 5, 2013

(54) METHOD FOR JOINING A PROFILED FIRST STRUCTURAL COMPONENT TO A SECOND STRUCTURAL COMPONENT

(75) Inventors: Peter Sander, Bremen (DE); Hans Marquardt, Fredensbeck (DE); Hauke Lengsfeld, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 802 days.

(21) Appl. No.: 11/904,312

(22) Filed: Sep. 26, 2007

(65) Prior Publication Data

US 2008/0083850 A1 Apr. 10, 2008

Related U.S. Application Data

(60) Provisional application No. 60/847,572, filed on Sep. 27, 2006.

(51) Int. Cl.
*B32B 37/10* (2006.01)

(52) U.S. Cl.
USPC ........... 156/285; 156/286; 264/511; 264/553; 264/571

(58) Field of Classification Search
USPC .......... 156/285, 286, 381, 382; 264/510, 511, 264/553, 571
See application file for complete search history.

(56) References Cited

U.S. PATENT DOCUMENTS

| | | | |
|---|---|---|---|
| 5,593,633 A * | 1/1997 | Dull et al. ...................... | 264/510 |
| 2001/0005061 A1* | 6/2001 | Holsinger ...................... | 264/257 |
| 2003/0019567 A1* | 1/2003 | Burpo et al. ................... | 156/245 |

FOREIGN PATENT DOCUMENTS

DE  26 42 523 A1  3/1978

OTHER PUBLICATIONS

Official Action corresponding to the German Patent Application No. 10 2006 045 634.3-22 dated May 6, 2008.
DE-Buch Grundlagen der Luftfahrzeugtechnik in Theorie and Praxis, Band I, Allgemeine Luftfahrttechnik, Verlag TÜV Rheinland GmbH, 1990.
German Office Action for DE 10 2006 045 634 dated Mar. 30, 2012.
Michael Chun-Yung Niu, "Composite Airframe Structures—Practical Design Information and Data," *Hong Kong Conmilit Press Ltd.*, Hong Kong ISBN 962-7126-06-6, 1992.

* cited by examiner

*Primary Examiner* — Christopher Schatz
(74) *Attorney, Agent, or Firm* — Jenkins, Wilson, Taylor & Hunt, P.A.

(57) ABSTRACT

The invention relates to a method for joining precured stringers to at least one structural component of an aircraft or spacecraft. A vacuum arrangement required for the joining is produced in two parts. In a first step, each precured stringer is covered in advance by a covering vacuum film. The stringers prepared in this manner are arranged on the structural component. Vacuum film strips are subsequently arranged in each case on adjacent stringers and over an intermediate space between the adjacent stringers. With the use of a vacuum sealing means, the vacuum film strips and the covering vacuum films 8 form a continuous vacuum arrangement. The stringers are subsequently joined under pressurization to the structural component with the use of this vacuum arrangement.

8 Claims, 2 Drawing Sheets

METHOD FOR JOINING A PROFILED FIRST STRUCTURAL COMPONENT TO A SECOND STRUCTURAL COMPONENT

CROSS-REFERENCE TO RELATED APPLICATIONS

This application claims the benefit of U.S. Provisional Application No. 60/847,572, filed Sep. 27, 2006, the entire disclosures of which are herein incorporated by reference.

FIELD OF THE INVENTION

The present invention relates to a method for joining a profiled first structural component to a second structural component of an aircraft or spacecraft.

BACKGROUND OF THE INVENTION

A problem on which the invention is based is explained below with reference to the production of a rudder unit for an aircraft. However, this is not a limitation for the method according to the invention which can be used in general in order to join profiled first structural components to second structural components.

The surface of a side rudder is essentially formed by structural elements of sheet-like design, for example panel elements. Supporting structural components which impart the necessary rigidity to the rudder unit and connect the individual panels to one another are arranged within the rudder unit. Said structural components are typically formed by "I-shaped" stringers.

For the production of a rudder unit which may be produced entirely from fiber composite materials, in particular the outer panels and the inner I-shaped stringers, suitable methods are required to ensure that the I-shaped stringers are joined to the panels.

One joining method makes provision for the panels to be supplied as unimpregnated semifinished fiber products.

The I-shaped stringers are arranged on the panels. The semifinished fiber product of the panels is then impregnated by means of an injection method. In the process, the stringers resting on the surface of the panels are wetted by the resin and stuck on.

The injection method requires a vacuum film to be arranged with a positive fit on the surface of the panels and the I-shaped supports. This requires a considerable, even partially manual effort in order to deposit the vacuum film on the internal or fillable surfaces when there are cut-outs, recesses, corner regions and edges of the I-shaped support.

SUMMARY OF THE INVENTION

An object of the present invention is to simplify the method for joining structural components.

The method according to the invention with the features of independent claim 1 provides a simplified method for joining profiled first structural components to second structural components, and achieves the abovementioned object.

According to the invention, the following method steps are provided for this:
providing a profiled first structural component, which comprises at least one fillable region;
depositing an auxiliary material on a fillable region in order to form the profiled first structural component into a filled first structural component having a rectangular cross section;
arranging the filled first structural component on the second structural component; and
depositing a vacuum film over the filled first structural component and at least partially over the second structural component for the pressurized pressing of the filled first structural component onto the second structural component.

In the present case, a filled structural component is understood as meaning the unit comprising a profiled structural component and an auxiliary material filling the latter.

The application of the vacuum film is simplified by the fillable regions being lined in such a manner that essentially a rectangular cross section arises from the auxiliary material and the profiled first structural component, i.e. the profiled stringer. With such simple cross sections, the film can be simply deposited and, when a vacuum is applied between the vacuum film and the profiled structural component, shapes itself uniformly onto the surface of the filled structural component with the rectangular cross section.

In a further method step, the filled first structural component and the second structural component are for example adhesively bonded to each other under pressurization and with the action of heat, and subsequently the auxiliary material is advantageously removed from the filled first structural component.

The pressurization can be achieved, firstly, by applying a vacuum between the vacuum film and the filled first structural component, but additionally also by the use of an autoclave and an air pressure of over 1 bar which is built up therein.

The one profiled first structural component and/or the second structural component can be produced from a fiber composite material.

The adhesive bonding can take place by inserting a resin matrix into the second structural component, which may be still unimpregnated. The resin matrix of the first structural component can be softened under the action of heat to assist this.

As an alternative, with the adhesive bonding, an additional, adhesively bonding material can be arranged between the structural components which can each be supplied preimpregnated, precured and/or cured in any combination.

The profiled first structural component can be produced in a bar-shaped manner, i.e. it has essentially a constant cross section in the longitudinal direction. The first structural component can be rectilinear or curved in the longitudinal direction.

The at least one profiled first structural component can be produced as a T-support and/or as an I-shaped support. Other forms of profiled first structural components are likewise conceivable, in particular all of the profiled structural components which can be inserted as stringers in aircraft construction.

In particular, a tear-off film is deposited between the auxiliary material and the profiled first structural component in order simply to be able to remove the auxiliary material from the profiled first structural component after the joining of the same to the second structural component.

The auxiliary material advantageously has rubber. Furthermore, the auxiliary material can be supplied as preshaped strips which, in particular, can be used more than once.

BRIEF DESCRIPTION OF THE DRAWINGS

The present invention is explained in more detail below with reference to an exemplary embodiment and attached figures, in which.

In the figures, the same reference numbers refer to identical or similar elements.

DETAILED DESCRIPTION OF THE INVENTION

Figure 1:
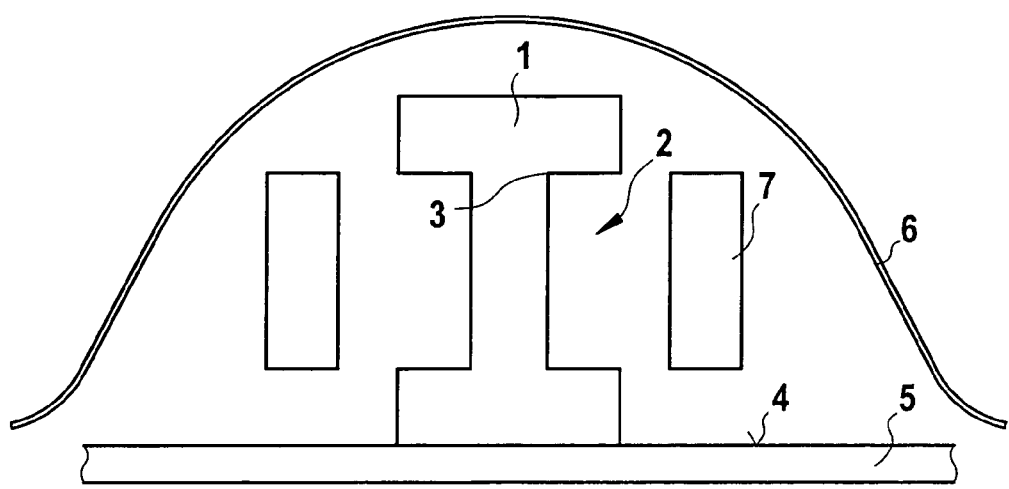
FIGS. 1 to 3 show cross sections for the illustration of method steps of an embodiment for joining an I-shaped stringer to a further structural element.

FIG. 1 shows an I-shaped stringer 1 in cross section. The latter stands by way of example for various other stringers or profiled structural components which are used in the aircraft or spacecraft during production. Other frequently used stringer shapes have a simple T-shape, an L-shape, etc. in cross section.

They are all distinguished in that they have at least one fillable region 2. In this case, fillable regions are understood as meaning that the surface of the stringer 1 has a curvature, depression, recess, etc. directed into the volume of the stringer 1. Internal edges 3, as shown in FIG. 1, typically arise in this case.

The I-shaped stringer 1 may be produced from a fiber composite material and can already be precured.

The fillable regions 2 are covered by means of an auxiliary material 7 such that essentially a rectangular cross section of the I-shaped stringer 1 together with the auxiliary material 7 arises. The I-shaped stringer 1 covered with the auxiliary material is referred to below as covered stringer.

The auxiliary material 7 can have rubber which is supplied in the form of mats or adhesive strips. In the manner illustrated in FIG. 1, the auxiliary material 7 is supplied as single-piece mats. However, this is only one possible configuration. The auxiliary material 7 may also be deposited in the form of a multi-layered structure.

The I-shaped stringer 1 may be arranged on the surface 4 of an essentially planar structural element 5 or other structural component, for example. The structural element 5 can form, for example, a panel or a surface for a rudder unit.

The structural element 5 can be likewise produced from a fiber composite material. In a first embodiment, the structural element 5 is supplied as an unimpregnated semifinished fiber product. One or more of the covered stringers are arranged on the surface 4 of the structural element 5.

A vacuum film 6 is subsequently laid over the covered stringer and the surface 4 of the structural element 5. By means of the application of a vacuum between the vacuum film 6 and the surface 4 of the structural element 5, the environmental pressure causes the I-shaped stringer 1 to be pressed against the structural element 5.

Figure 2:
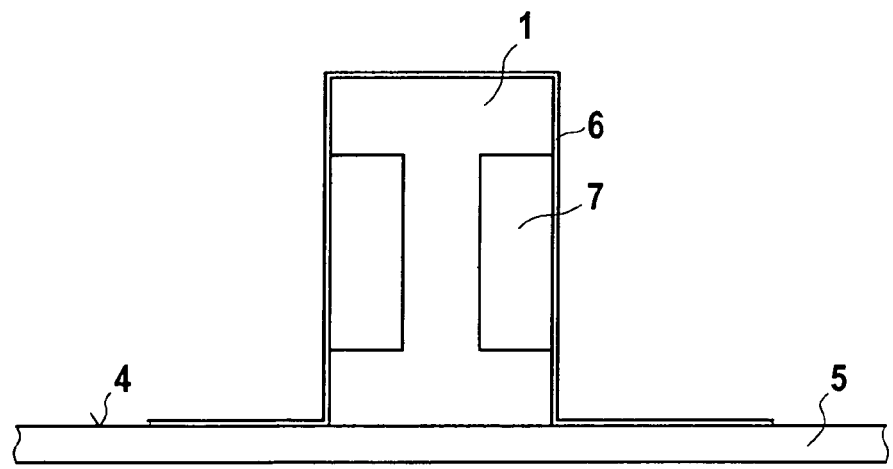
Figure 3:
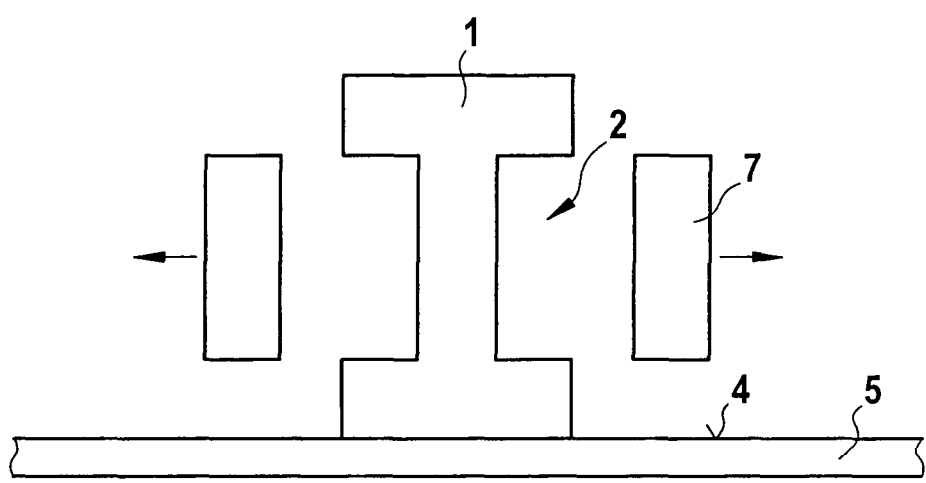

The previous covering of the fillable regions 2 by means of the auxiliary material 7 prevents the formation of air inclusions on depressions and/or corners of the stringer. In particular, no air inclusions arise in the region in which the covered stringer is laid on or in the vicinity of the surface 4 of the structural element 5. Upon pressurization of the vacuum film 6, for example by the application of the vacuum between the vacuum film 6 and the surface 4, the cross section illustrated in FIG. 2 is produced.

A resin matrix is subsequently inserted into the structural element 5 by means of an injection method or infusion method. In addition to the impregnating of the semifinished fiber product of the structural element 5, this results in adhesive bonding of the covered stringer and of the structural element 5 to the supporting surface.

In an exemplary method, the structural element 5 and the covered stringer are heated such that a resin matrix of the fiber composite material of the stringer is softened and becomes sticky. The heating can be realized, for example, in an autoclave for the injection method.

After the covered stringer is adhesively bonded to the structural element 5, the vacuum film 6 is removed. The mats with the auxiliary material 7 are subsequently also detached from the I-shaped stringer 1. In order to simplify the detaching, a tear-off film can be arranged in the fillable regions 2 between the auxiliary material 7 and the I-shaped stringer 1.

The sequence of the depositing of the auxiliary material 7 and of the arranging of the I-shaped stringer 1 on the structural element 5 may be interchanged depending on the workpiece to be produced. Generally, it is advantageous to first of all deposit the auxiliary material 7, since the fillable regions 2 are more easily accessible at this time.

Although the present invention is described with reference to an embodiment, it is not restricted thereto.

In particular, the structural element 5 can likewise be prepared from a preimpregnated, if appropriate precured, fiber composite material. The adhesive bonding can take place again by heating of the resin matrix. As an alternative or in addition, an adhesive can be arranged between the I-shaped stringers 1 and the structural element 5. In this case, the pressurization by means of the vacuum film 6 ensures that the stringer 1 is pressed uniformly onto the structural element 5 during the curing of the adhesive or of the resin matrix.

What is claimed is:

1. A method for joining a profiled first structural component to a second structural component of an aircraft or spacecraft, comprising the following method steps:
   (a) providing the profiled first structural component, which comprises at least one fillable region;
   (b) depositing an auxiliary material on the at least one fillable region in order to form the profiled first structural component into a filled first structural component having a rectangular cross section, the auxiliary material being of a material different from a fiber composite material, wherein the auxiliary material is provided in the form of adhesive strips;
   (c) arranging the at least one filled first structural component on the second structural component, wherein the second structural component is supplied as an unimpregnated semifinished fiber product;
   (d) depositing a vacuum film over the filled first structural component and at least partially over the second structural component for the pressurized pressing of the filled first structural component onto the second structural component by environmental pressure by application of a vacuum;
   (e) softening the first structural component under action of heat; and
   (f) adhesive bonding of the softened first and the second structural element by inserting a resin matrix into the second structural component by an injection or infusion method.

2. The method according to claim 1, wherein subsequently to the adhesive bonding, the auxiliary material is removed from the filled first structural component.

3. The method according to claim 1, wherein at least one of the profiled first structural component and the second structural component is produced from a fiber composite material.

4. The method according to claim 1, wherein the profiled first structural component is bar-shaped.

5. The method according to claim 1, wherein the first structural component is at least one of a T-support and an I-shaped support.

6. The method according to claim 1, wherein the profiled first structural component is a stringer of the aircraft or spacecraft.

7. The method according to claim 1, wherein a tear-off film is deposited between the auxiliary material and the profiled first structural component.

8. The method according to claim 1, wherein the auxiliary material is made of rubber material.

\* \* \* \* \*